July 8, 1930.    A. H. LEIPERT    1,770,209
CUSHION CONNECTION FOR VEHICLE CONSTRUCTION
Filed Feb. 16, 1926
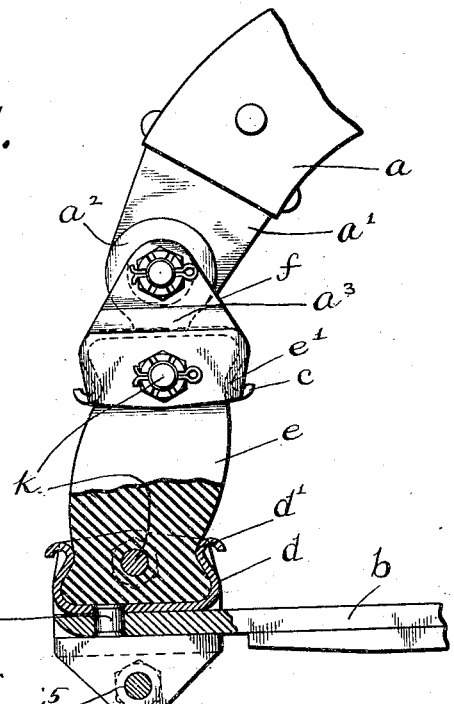
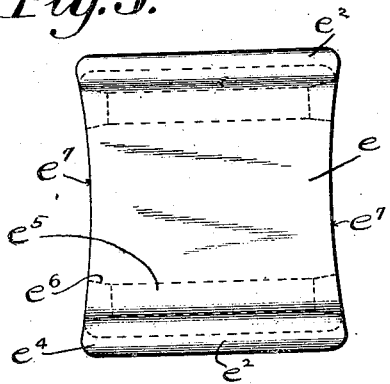
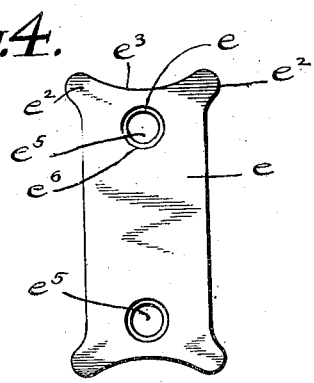
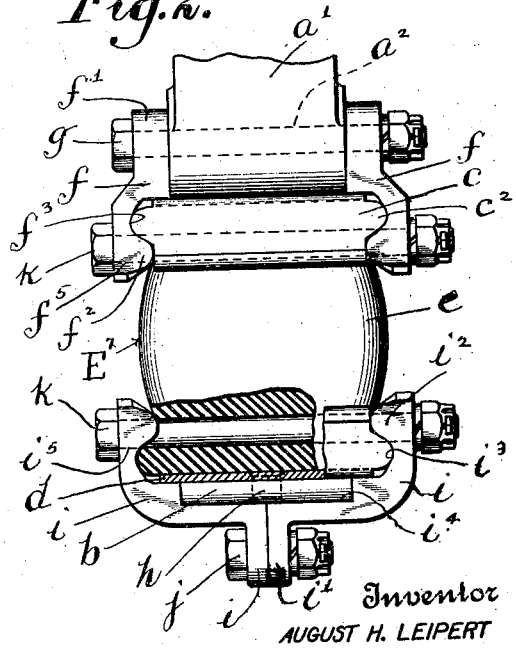
Inventor
AUGUST H. LEIPERT
By his Attorneys
Redding, Greeley, O'Shea & Campbell Patented July 8, 1930

1,770,209

UNITED STATES PATENT OFFICE

AUGUST H. LEIPERT, OF NEW YORK, N. Y., ASSIGNOR TO INTERNATIONAL MOTOR COMPANY, OF NEW YORK, N. Y., A CORPORATION OF DELAWARE

CUSHION CONNECTION FOR VEHICLE CONSTRUCTION

Application filed February 16, 1926, Serial No. 88,562, and in Great Britain November 1, 1926.

This invention relates to cushion connections between parts of a motor vehicle one of which parts is to be connected to and supported by the other part. More particularly the invention relates to a wholly non-metallic mechanical connection and support between a vehicle leaf spring and the chassis frame and has for its object a structure of extreme simplicity in the interest of ease and cheapness of manufacture and facility of installation. In the preferred embodiment of the invention it is sought to utilize the co-operating parts of spring and chassis structure which are standard in automotive practice today. Accordingly it is proposed to interpose a block of yielding non-metallic material between the respective ends of the spring and the longitudinal side member of the chassis frame and provide devices in the nature of seats to engage spaced portions of the yielding non-metallic material and rigidly retain such portions in operative relation with the connected parts to prevent disassociation thereof in operation. More particularly seats are adapted to be secured to the spring and chassis frame within which spaced portions of the respective block are adapted to be secured preferably by means of bolts and the entire structure is so arranged as to be capable of ready assembly and disassembly as occasion may require. In order that the invention may be clearly understood and readily carried into effect the same will now be described more fully with reference to the accompanying drawings illustrating a preferred embodiment thereof and in which:

Figure 1 is a view in side elevation and partly in section showing a cushion connection and support of the character forming the subject matter of the present invention.

Figure 2 is a view in rear elevation showing the connection illustrated in Figure 1, parts being removed in the interest of clearness.

Figure 3 is a view showing the shape of the block of yielding non-metallic material before it is disposed within the co-operating seats and distorted under compressive stresses.

Figure 4 is a view showing the block of Figure 3 in end elevation.

Referring to the drawings the longitudinal side frame member $a$ is adapted to be connected to and supported from the vehicle spring $b$ by the wholly non-metallic mechanical connection and support according to the present invention. It is proposed to utilize as far as possible the usual structure which conforms to standard automotive practice. It is customary to secure to the end of the spring horn $a$ a member such as indicated at $a'$ formed with an eye $a^2$ adapted to receive the bolt connecting the usual metallic spring shackle thereto. This structure is availed of with the present connection by the formation of a flat $a^3$ on the lowermost side of the eye $a^2$ for the reception of one of a pair of co-operating seats $c$, $d$, which are U-shaped in cross section as shown in Figure 1 and which are adapted to receive and securely hold spaced portions of a block of yielding non-metallic material $e$ serving as the cushion connection and support therebetween. The block is preferably formed somewhat oversize as indicated in Figures 3 and 4 and the respective ends $e'$, Figure 4, are provided with enlarged curvilinear edges $e^2$ along the sides thereof forming therebetween a concave portion $e^3$ so that when the block is slid endwise into the relatively long trough-shaped seat it will be compressed laterally and rigidly retained under internal static pressure in a direction transverse to the block. Of course, being oversize, the block will be distorted outwardly beyond the ends of the seats and to further contribute to the compression of that portion of the block within the seat end pieces are availed of which compress the block longitudinally thereof and also secure the block and seats to the respective connected members. The end clamping members securing the seat $c$ and upper end of block $e$ to the spring horn are illustrated in Figures 1 and 2 at $f$, $f$, and are provided at their uppermost portion with apertured lugs $f'$ through which a bolt $g$ in the eye $a^2$ passes to rigidly secure the same in clamping engagement with the seat and block. At the lower extremities the clamping members are formed with shoulders $f^2$ corresponding in function to portions c', d' of the seats which grip and compress the yielding non-metallic material within the retained portion. Inwardly of the shoulder each clamping member is recessed as at f³ to permit of the distortion of the blocks and in order to still compress the metal within that portion of the clamping member the seats are provided with ears c² as shown clearly in Figure 2.

The lower seat d while similar in every respect to the seat c is preferably secured to the end of the spring to prevent displacement in the longitudinal direction of the spring by a rivet or the like h and the lower clamping members i, i similarly have shoulders i² and recessed portions i³, corresponding to the shoulders and recesses f², f³, respectively. Clamping members i, however, are also so formed as to rigidly engage the end of the spring and to this end they are formed with a recess i⁴ within which the spring is disposed and outwardly depending apertured lugs i' are adapted to receive a through bolt j which serves to rigidly retain the two clamping members i in clamping engagement with the seat d, the lowermost portion of the block of non-metallic material e and the spring end b.

To further contribute to the securing of the spaced bolts of the block of yielding non-metallic material within the respective seats and clamping members bolts k may be availed of and these bolts are shown as passing through apertures f⁵ in the clamps f and i⁵ in the clamps i and also passing through apertures e⁵ in the yielding non-metallic material. Preferably the end of the apertures e⁵ are countersunk as at e⁶ in order to facilitate the insertion of the bolts therein and also to permit of a degree of distortion when the material is placed under compression.

It is thought that the manner of assembly of the device will be readily understood from the foregoing description. Upon assembly the spaced ends e', of the block e will be tightly gripped by the shoulders on the seats and clamps and the blocks will be further retained against displacement within the seats by means of the bolts k to prevent any possibility of the withdrawal of the end of the block from the seat under conditions of rebound, for instance. Normally the block e will be under considerable compression due to the weight of the vehicle body resting thereupon and for this reason the end surfaces e⁷ of the blocks are initially formed somewhat concave as shown in Figure 3 but after the block is under compression the peripheral surfaces will be distorted as shown at E⁷. The concave surfaces e⁷ together with the somewhat greater width than height further materially contribute to the capacity the block has to resist side sway and axial twisting of the spring and thus an effective connection and support is provided between the end of the spring and the chassis frame which requires no lubrication, is noiseless and is not subject to the same degree of wear as a connection involving metal to metal contacts. Rubber is preferably utilized as the yielding non-metallic material since by maintaining it under compression its resiliency, strength and wearing qualities are materially improved. By the present construction the block e is always under a live load and consequently working internally at all times.

Various modifications may be made in the form and configuration of the block and seats as well as in the manner of securing the respective clamps together and no limitation is intended by the foregoing phraseology or illustrations except as indicated in the appended claim.

What I claim is:

In a cushion connection of the character described, the combination with two parts, one of which is to be connected to and supported by the other of a solid block of yielding non-metallic material mounted under compression, portions formed thereon for securing the block in position, interengaging cooperating means carried with the respective parts to engage the securing portions of the yielding non-metallic material and retain said spaced portions under compression in all directions transverse to that of the load and normally tending to prevent separation of the block from the seat, and means passing through the block to hold it positively to the seat.

This specification signed this 11th day of February A. D. 1926.

AUGUST H. LEIPERT.